United States Patent [19]

Bibeau

[11] 4,035,564
[45] July 12, 1977

[54] POLYMERIZATION PROCESS FOR PRODUCING POLYCHLOROPRENE PARTICLES

[75] Inventor: Alexander A. Bibeau, Webster, N.Y.

[73] Assignee: Monsanto Company, St. Louis, Mo.

[21] Appl. No.: 430,436

[22] Filed: Jan. 3, 1974

Related U.S. Application Data

[63] Continuation-in-part of Ser. No. 258,006, May 30, 1972, abandoned.

[51] Int. Cl.² ............ C08F 2/00; C08F 4/00; C08F 34/00; C08F 134/00
[52] U.S. Cl. .................... 526/225; 526/229; 526/234; 526/295; 526/909; 526/915
[58] Field of Search .............. 260/84.3, 92.3; 526/295, 909, 915, 234, 229, 225

[56] References Cited

U.S. PATENT DOCUMENTS

| | | | |
|---|---|---|---|
| 2,383,055 | 8/1945 | Fryling | 260/84.3 X |
| 2,546,244 | 3/1951 | Tucker | 260/84.3 X |
| 2,739,136 | 3/1956 | Kharasch et al. | 260/92.3 X |
| 3,523,111 | 8/1970 | Bibeau et al. | 260/92.8 W |
| 3,740,368 | 6/1973 | Sturt et al. | 260/84.3 X |

Primary Examiner—Herbert J. Lilling
Attorney, Agent, or Firm—W. J. Farrington; J. C. Logomasini; S. M. Tarter

[57] ABSTRACT

There is disclosed a polymerization process for the preparation of large chloroprene polymer particles having an average diameter in the range of from 0.15 to 2.0 microns. The process utilizes a polymerization medium and catalyst system that produces a substantially monodisperse particle size distribution of polychloroprene rubber particles in an aqueous dispersion, said particles having great utility as a rubber phase in thermoplastic polyblends.

20 Claims, No Drawings

POLYMERIZATION PROCESS FOR PRODUCING POLYCHLOROPRENE PARTICLES

This application is a continuation-in-part of copending application Ser. No. 258,006, filed May 30, 1972 and now abandoned.

BACKGROUND OF THE INVENTION

Chloroprene polymers have had great utility as rubbers. However, because of the extremely fast polymerization rates of chloroprene monomers, processes for polymerizing chloropene monomers have been difficult to control. Moreover, the high heat of polymerization has made it difficult to control the properties of the chloroprene polymers in particular the molecular structure and the particle properties. Emulsion processes have been used to produce relatively small particles, i.e., less than 0.15 microns in diameter which have been used extensively in paints and coatings. These products usually require small particles to insure emulsion stability and dispersibility.

Chlorprene rubbers are known to be fire-resistant and can be incorporated in compositions to insure self-extinguishing properties. Being rubbers they can be used in thermoplastic polyblends as a rubber phase for added toughness. Such uses of chloroprene polymers require closely controlled properties in the rubber, particularly the particle size parameters. Tough polyblends require larger particles than those produced by the known commerical emulsion processes. Sophisticated engineering properties can only be obtained by using polychloroprene particles that are controlled as to average particle size and particle size distribution. Prior art emulsion processes have been found to be grossly deficient in meeting these requirements.

Accordingly, it is an objective of the present invention to provide a polymerization process that can produce large chloroprene polymer particles having a predetermined weight average particle diameter and a narrow particle size distribution wherein the diameter of the particle size is in the range of from 0.15 to 2.0 microns.

It is also an object of this invention to provide a process with a high level of reproducibility that can provide stable aqueous dispersions of large chloroprene polymer particles having substantially monodisperse particle size distributions.

SUMMARY OF THE INVENTION

It has now been found that the foregoing and related objectives can be obtained in a polymerization process for producing large particles of chloroprene polymer having a weight average particle diameter in the range of from 0.15 to 2.0 microns, preferably 0.25 to 1.5 microns, and a narrow particle size distribution. The process comrprises the following steps (1) forming a polymerization medium by admixing water, compounds providing a redox catalyst system comprising radicals of sulfate and sulfite, an activating metal ion, and optinally, an emulsifying agent; (2) allowing interaction of the materials in the polymerization medium to occur; (3) and thereafter introducing and dispersing a chloroprene monomer formulation in said medium; (4) introducing and dispersing (a) a compound providing additional sulfate radical in said medium and (b) an emulsifying agent; and (5) polymerizing the monomer formulation until at least a major portion of said chloroprene monomer formulation has been converted to an aqueous dispersion of chloroprene polymer particles wherein the polymer particles have a weight average diameter in the range of from 0.15 to 2.0 microns and preferably from 0.25 to 1.5 microns.

The addition of the monomer, additional sulfate compound and additional emulsifying agent be carried out sequentially or simultaneously, provided that polymerization of the monomer to polymer should have begun prior to the addition of the emulsifying agent in step (4), above.

Although the theory of the present invention is not fully understood, it is believed that the effectiveness of the technique is derived from the control of oligomeric soap is formed during the early stages of polymerization. In the polymerization of chloroprene in a redox system, it is thought that chlorprene oligomeric chains are formed having sulfate and/or sulfate radicals forming a soap. Since this soap may function as an emulsifying agent, it can profoundly influence the size of particles which are ultimately obtained from the polymerization process. Therefore, since the amount of oligomeric soap which is formed in situ is not known or is not predictably under the conditions conventionally utilized wherein monomer and catalyst system are added to the emulsion medium at about the same time, the amount of soap may vary from run to run resulting in non-reproducibility of the average particle sizes and narrow size distribution.

It is believed that the period of interaction which is provided prior to the introduction of any monomer results, for one reason or another, in a consistant level of reactivity of the catalyst system. In the present process, some of the metal ions may react with the emulsifying agent or with the catalyst during the interaction period to provide a stable level of catalyst components. Whatever the mode of operation, the interaction period provided in the present invention results in control of the amount of oligomeric soap which is formed, thus making the process reproducible by control of the interaction period.

The polymerization medium in which the monomer formulation is dispersed comprises water, the compounds which make up the redox catalyst system and optionally, an emulsifying agent. Normally, a buffering agent will also be included in the polymerization medium in order to stabilize the pH of the system. The amount of water which is utilized can vary greatly so long as there is a sufficient amount to consititute an aqueous phase for the polymerization reaction. Generally, about 60 to 600 parts of water per 100 parts of polymerizable monomer will be utilized (a ratio of about 0.6–6.0:1.0), and preferably about 100 to 200 parts per hundred of monomer (a ratio of about 1.0–2.0:1.0).

Any of the emulsifying agents which are commonly used for this type of emulsion polymerization reaction can be incorporated initially into the polymerization medium. The ammonium and alkali metal sulfates of long chain saturated aliphatic compounds containing from 10 to 20 carbon atoms have been particularly advantageous in the process, such as the ammonium, sodium and potassium salts of decyl, lauryl, palmityl, stearyl, dodecanoyl, etc. sulfates.

The total amount of emulsifying agent which is utilized depends, of course, upon the total amount of monomer which is to be emulsified as well as the desired particle size. Generally, the total amount of emulsifier employed will be in the range 0.15 to 0.50 percent by weight, and preferably about 0.20 to 0.03 percent, based upon the weight of monomer formulation. In the initial charge for the polymerization medium of step (1), none or only a fraction of the total amount of emulsifying agent is generally used. The amount of emulsifying agent admixed initially with the water generally is about 0.000 to 0.200 percent, and preferably 0.000 to 0.15 percent, based upon the weight of monomer to be introduced, with the remaining emulsifying agent being added with the additional sulfate radical in step (4).

In the preferred process for producing particles having average diameters in the range of 0.25 to 1.5 microns and larger, the emulsifying agent is eliminated entirely in step (1) and added in step (4) after polymerization of the monomer into polymer has begun.

In the polymerization reaction, the pH of the emulsion should normally be controlled within the range of about 4.0 to 8.0 by the incorporation of a buffering agent since it is found that the best rates of reaction are usually attained when the pH value is maintained within this range. Although any suitable buffering agent may be used, sodium bicarbonate has been found to be highly beneficial, at least in part because its decomposition products ar innocuous to the resultant polymer. However, other buffers which are relatively inert to the chloroprene polymer may also be used such as sodium carbonate, ammonium hydroxide, etc. The buffer is incorporated into the polymerization medium at the time that it is prepared.

In forming the redox catalyst system, any compounds which will provide the necessary radicals can be used, and such compounds are well known to those who are skilled in the art. Exemplary sources of the sulfate and sulfite radicals are persulfate-bisulfate and bisulfite-peroxide mixtures. It will be appreciated that each radical may be provided separately by suitable water-soluble sulfate or sulfite compounds, or that, alternatively, a radical may be formed in situ from a sulfur compound, such as when bisulfite-peroxide mixtures are used.

Any of the water-soluble peroxides and persalts may be used to furnish the sulfate radical, the ammonium, sodium and potassium persulfates being particularly preferred. The sulfite radical may be provided by sodium bisulfite, sodium formaldehyde sulfoxylate, sulfur dioxide, sodium thiosulfite or an organic oxidizable sulfoxy compound such as diethyl sulfite, etc. These compounds should be used in amounts which will yeild the desired radicals in the required amounts.

The quantity of sulfate to be used in step (1) of the polymerization medium will depend on the size polychlorprene particle desired. For particles having an average diameter from 0.15 to 0.5 microns, the sulfate concentration used respectively is generally about 0.010 to 0.002 percent by weight based on monomer and preferably 0.006 to 0.003 percent. When particles with relatively larger average diameters are desired, e.g., 0.5 to 1.5 microns, then generally the sulfate concentration respectively is generally about 0.002 to 0.00001 percent and preferably about 0.003 to 0.001 percent by weight based on monomer.

The amount of the sulfite component should be chosen so that the ratio of sulfite to total sulfate used in steps (1) and (4) is about 1.0–15.0:1.0 and preferably about 3.0 to 10.0:1.0. Considering that the total amount of sulfate used in steps (1) and (4) is generally 0.01 to 0.10 percent by weight based on monomer then the amount of bisulfite to be used in step (1) is generally about 0.01 to 1.5 percent by weight based on monomer and preferably about 0.03 to 1.0 percent.

The redox catalyst system is added in step (1) as part of the polymerization medium. A small controlled amount is added in step (1) and allowed to interact in step (2). It is believed that a small and controlled amount of oligomeric soap is then generated as the monomers are added to step (3). The chloroprene monomer has a low water solubility and forms oligomers with the redox catalyst as it enters the water phase polymerization medium. In addition to oligomers, a controlled and small amount of oligomeric radicals are formed in the water phase. These oligomeric radicals become water insoluble and enter the monomer oil phase micelles formed by the oligomeric soap to start a controlled concentration of particles growing. This controlled concentration of monomer-polymer micelles are now believed to govern the kinetics of polymerization in that polymerization is largely carried out in the monomer-particle micelles. In the present process, the micelles are larger and fewer in number due to the low level of oligomeric soap generated. As a result, polymerization rates are slower, controlling the ordinarily very rapid polymerization of chloroprene in the usual emulsion process having large amounts of emulsifier and many small micelles for polymerization.

Regardless of theory in the present invention, the polymerization is carefully controlled in the early stages by the use of chloroprene oligomeric soaps and chlorprene oligomeric free radicals giving a controlled particle size and particle size distribution. In addition, polymerization rates are controlled giving a reproducible process.

Step (2) of the process then is critical in that redox system has an interaction step wherein the metal ions activate the catalyst in a controlled programmed step allowing the redox system to stablize. The persulfate decomposes almost instantly in the early stages providing uncontrollable numbers of sulfate free radicals. The interaction step is provided to allow this initiation stage to stablize to a steady state that is controllable. Step (3) brings the monomer into a controlled polymerization medium initiating controlled oligomer growth. Step (4) brings in additional catalyst to insure high conversion of the monomer in step (5) recognizing that the number of polymer particles being formed has already been set by the existing number of monomer-particle micelles formed in step (3).

The monomers may be added in total or added incrementally or continuously in step (3). All or the remaining portion of the emulsifying agent is added in step (4) after polymerization has begun in order to disperse the monomer giving increased rates of diffusion of monomer to the micelles as the major portion of the monomers are polymerized in the existing monomer-particle micelles providing controlled growth of the existing particles and a narrow distribution of particle sizes. In the preferred method, a major portion of the monomers is charged initially in step (3) and the remaining monomer added incrementally thereafter along with the additional sulfate radical and emulsifying agent. The introduction of the remaining monomer, additional sulfate radical and all of the remaining portion of the emulsifying agent into the reaction vessel may be carried out sequentially or simultaneously.

For the redox catalyst system to function properly, it is also necessary that a trace amount of activating metal ions be present. This metal may by any which is well known to the art, such as iron, copper, chromium, etc. Often, it is not necessary to add the metal ion as a separate component since sufficient amounts are usually present as trace-impurities in the water which may be used for the polymerization medium. Of course, if for some reason, it is desirable to use highly purified or deionized water, it may be found necessary to introduce the activating metal ion separately.

Modifiers or chain transfer agents may be used in the monomer formulation to control the molecular weight of the chloroprene rubber. Various materials may be used, e.g., mercaptans, disulfides, terpenes, sulfur and amines. The most preferred are mercaptans, e.g., normal and tertiary octyl, decyl and dodecyl mercaptans in relative small percentages by weight based on monomer such as 0.001 to 1.0 percent.

The monomer formulation may contain up to 2% by weight of crosslinking agent based on the chloroprene rubber forming monomer or monomers if a crosslinked rubber is desired. The crosslinking agent can be any of the agents conventionally employed for crosslinking diene rubbers, e.g., divinyl benzene, divinyl ethers, sulfides, diallyl maleate, allyl acrylates and the like.

After all of the foregoing ingredients have been admixed and such other material introduced as may be desirable, the resulting medium is heated with agitation, usually under a vacuum in order to remove any dissolved atmospheric gases, to a temperature within the range 30° to 80° Centigrade, and more desirably within the range 45° to 65° Centigrade. The period of interaction may vary over a wide range but generally be at least about 10 minutes. A period of three hours represents a practical upper limit. Normally, an interaction period of less than one hour is sufficient, and the preferred period is from 15 to 45 minutes. It is to be noted that the criterion upon which the induction or reaction is based is only that it provides a catalyst system having a reactivity which is so stabilized that it can be reproduced from run to run by providing a like interaction period.

At the completion of the interaction period, the polymerizable monomer formulation is introduced into the medium and dispersed. The monomer charge may be added all at once or, alternatively, the monomer may be introduced incrementally or continuously. In the preferred method, a fairly large charge is added initially, and the remaining monomer is added incrementally thereafter.

Conditions in the reaction vessel are adjusted, if necessary, to provide a suitable environment for the polymerization of monomer to occur. A temperature of about 30° to 80° Centigrade and autogeneous pressures are maintained. The pressure within the reaction vessel can be above autogeneous pressures, e.g., as high as 150 p.s.i.g. The preferred polymerization temperature range is about 45° to 65° Centigrade.

The reaction is continued until about 60.0 to 98.0 percent of the monomer formulation present has been converted to polymer, and preferably until 70.0 to 94.0 percent conversion. This will require a polymerization period of about two to fourteen hours and preferably about three to ten hours. After the desired degree of conversion has been attained, the particles of polymer are separated from the reaction medium by conventional techniques, washed and dried if desired. However, since the process is directed to producing a particular large size polychloroprene polymer particle the process is terminated with the particles dispersed in an aqueous dispersion maintaining the integrity of the particle. The aqueous dispersion of polychloroprene particles can then be vacuum vented at elevated temperatures to remove unpolymerized monomers and the polymer particles stabilized with a dispersed stablilizer such as phenyl-$\beta$ naphthyl-amine, thiuram sulfide or other antioxidants to stop crosslinking or degradation in the unvulcanized state. Such stabilizers are generally used in amounts up to 2% by weight, based on weight of the polymer, depending on the level of stabilization desired.

The present process can be conducted so as to produce aqueous dispersions of chloroprene polymer particles having multimodal particle diameter distribution by providing the additional step of blending aqueous dispersions of monomodal distributions of different monodisperse sizes to provide any reasonable number of modes, preferably two or three.

Since the process of this invention is generally run so as to produce aqueous dispersions of chloroprene polymer particles having a definite percentage by weight of polymer particles or solids in aqueous dispersions, it is ideal for blending. The blended aqueous dispersions can be controlled as to solid contents and accurate blending of particles by weight percent can be controlled giving any desired multimodal dispersions of particles. Generally blends of large and small monodisperse particles have great utility in coatings or as used as rubber phase particles in thermoplastic polyblends. For example, a blend of chloroprene polymer particles having a first mode comprising 50% to 95% by weight of particles of 0.2 to 0.5 microns blended with a second mode comprising 5 to 50% by weight of particles of 0.5 to 1.5 microns is the preferred blend to be used with other thermoplastic polymers to form tough polyblends.

Such thermoplastic polyblends are prepared by blending aqueous dispersion of the thermoplastic polymer, e.g., polystyrene or SAN polymers in aqueous dispersions with the above described chloroprene polymers in aqueous dispersion to provide a uniform blend of chloroprene polymer particles and thermoplastic polymer particles. The blend of particles are recovered from the aqueous dispersion by coagulation, filtering and drying. The thermoplastic polyblend is further melt colloided, e.g., by extrusion, milling, banburying or other melt colloiding methods known in the art to provide a dispersion of chloroprene rubber particles in a solid thermoplastic polyblend.

The chloroprene polymer particles in aqueous dispersion can also be blended with monovinylidene aromatic monomer and/or an ethylenically unsaturated nitrile, such as styrene and acrylonitrile, respectively, and then grafted with said monomers to provide grafted chloroprene polymer particles than can be dispersed in thermoplastic polyblends giving physical and engineering properties having great utility.

Alternately, the resulting aqueous dispersion can be used directly by recovering the rubber from the dispersion.

Although, throughout the specification the invention has been described in terms of chloroprene, it is also applicable to copolymers thereof in which the chloroprene constitutes at least 50% by weight of the copolymer and preferably at least 80.0%. Among the materials that can be copolymerized with chloroprene in the process of the invention are conjugated 1,3 dienes, e.g., butadiene, isoprene, piperylene, etc.; monovinylidene aromatic monomers, e.g., styrene, arhalostyrenes, aralkylstyrenes, alphaalkylstyrenes, e.g., alpha-methylstyrene, o, m, and p-chlorostyrene and methyl-styrene, etc., ethylene unsaturated nitriles, e.g., acrylonitrile, methacrylonitrile, etc.; alkyl acrylates, e.g., methyl acrylate, etc.; alkyl methacrylates, methyl methacrylate, etc.; alpha olefins, e.g., ethylene, propylene, etc.; vinyl esters, e.g., vinyl acetate, e.g.; vinyl and vinylidene chlorides and bromides and the like.

DESCRIPTION OF THE PREFERRED EMBODIMENTS

The following specific examples are illustrative of the efficacy of the present invention wherein all parts and percentages are by weight unless otherwise specified. It is obvious that many variations may be made in the process of this invention without departing from the spirit and scope thereof as defined in the appended claims.

EXAMPLE 1

About 150 parts of water at 54° C. are introduced into a reaction vessel under agitation along with 0.1 parts of sodium bicarbonate, 0.15 parts of sodium bisulfite. A vacuum is drawn on the vessel for about 20 minutes after which about 0.002 part of potassium persulfate is added slowly. After the addition is complete, a vacuum is again drawn on the reactor and the polymerization medium is maintained at about 54° C. and allowed to further interact over a period of 15 minutes. One hundred parts of chloroprene monomer are then dispersed in the polymerization medium and the medium brought to 50° C. and autogeneous pressure. About 0.013 parts of sodium lauryl sulfate and about 0.02 part of potassium persulfate are dissolved in 50 parts of water and introduced and dispersed into the medium. The resulting dispersion is subjected to polymerization at 50° C. and autogenous pressures for 4 hours. At the completion of the reaction period, and excess monomers are vented under vacuum at 60° C. and the chloroprene rubber particles in the aqueous dispersion measured for particle size.

A Model 3000 Particle Size Analyzer available from Martin Sweets Company, 3131 West Market Street, Louisville, Kentucky was used in conjunction with the procedure of Groves, M. J. et al., "Size Analysis of Subsieve Powders Using a Centrifugal Photosedimentometer", British Chemical and Engineering, 9:742–744 (1964). The density of the polychloroprene particle being taken as 1.32 gm/cc. in determining weight-average particle size. The weight average diameter of the particles formed is about 0.610 microns.

Several runs were made as in Example 1 giving respectively particle weight average diameters of 0.606, 0.598, 0.600, 0.619, 0.614 and 0.611 microns demonstrating a range of about ± 0.010 micron from the weight average particle diameter for each run.

EXAMPLE 2

The procedure of Example 1 is used except employing 0.17 parts of sodium lauryl sulfate in the polymerization medium of step (1) and 0.10 parts of dispersing agent is added with the sulfate radical in step (4). The weight average particle size is about 0.200 microns. Several runs were made showing good control of particle size with a range of about ± 0.010 microns from the weight average particle diameter for each run.

EXAMPLE 3

The procedure of Example 1 is repeated except that the interaction step for the polymerization medium was not used and the vinyl monomers were charged directly into the polymerization medium before the redox system had interacted. Several different runs were made in this manner and the weight average particle size is found to be 0.550, 0.531, 0.622, 0.601, 0.592, 0.623, 0.595 microns in diameter. The weight average particle size range was from 0.531 microns to 0.623 microns demonstrating a range of about ± 0.046 micron from the weight average particle diameter, which is considered to be relatively poor reproducibility of particle size where controlled particle size is critical to end-use properties.

EXAMPLE 4

The procedure of Example 1 is substantially repeated using 95.0 parts of chloroprene and 5.0 parts of acrylonitrile as the monomer formulation. In several runs it was found that the weight average particle size was found to be reproducible as in Example 1 with a narrow range of particle sizes.

EXAMPLE 5

The procedure of Example 1 is used except that 0.006 parts of sodium lauryl sulfate is dissolved in the polymerization medium of step (1). The weight average particle size is about 0.80 microns. Several runs were made and the weight average particle diameter was found to be reproducible within ± 0.01 microns.

EXAMPLE 6

The example illustrates the blending of two polychloroprene dispersions, with different weight average particle diameters in order to obtain a polychloroprene dispersion with a bimodal particle size distribution. Each polychloroprene dispersion contains about 33% by weight of polymer particles.

About 800 grams of a stable aqueous dispersion of chloroprene polymer particles as prepared in Example 2 having a monodisperse weight-average particle size of 0.2 microns, is introduced into a mixing vessel held at about 23° C. About 200 grams of a second stable aqueous dispersion of chloroprene polymer particles, as prepared in Example 1, having a monodisperse weight-average particle diameter of 0.6 microns, is blended with the first aqueous dispersion under agitation for a period of time sufficient to produce a uniform stable aqueous composite dispersion of chloroprene polymer particles having a bimodal distribution of particle sizes. The particle size distribution of the blend is measured as in Example 1. The resulting blend has a bimodal distribution with 80% of the particles being a monodisperse mode having a weight average particle size of about 0.2 microns and 20% of the particles having a monodisperse mode having a weight average particle size of about 0.6 microns. The particles are found to be dispersed as discrete individual particles in the stable composite dispersion with essentially no agglomeration of small and large particles to distort the bimodal distribution providing a stable aqueous dispersion of polychloroprene polymer particles.

What is claimed is:

1. A polymerization process for producing large particles of chloroprene polymer having a weight average particle diameter in the range of from 0.15 to 2.0 microns and a monodisperse particle size distribution which process comprises:
   1. forming a polymerization medium by admixing water, a redox catalyst system comprising radicals of sulfate and sulfite, an activating metal ion, and optionally an emulsifying agent;
   2. allowing interaction of the materials in the polymerization medium to occur for a period of time ranging between 10 minutes and three hours, and thereafter;
   3. dispersing a chloroprene monomer formulation in the polymerization medium;
   4. dispersing into the polymerization medium
      a. a compound providing additional sulfate radical; and
      b. an emulsifying agent in the polymerization medium provided that polymerization of the monomer to polymer has begun before adding the emulsifying agent;
   5. polymerization the monomer formulation at a temperature in the range of from 30° to 80° C. until at least a major portion of the chloroprene monomer formulation has been converted to an aqueous dispersion of chloroprene polymer particles;

wherein the ratio of water to chloroprene monomer formulation is in the range of from 60 to 600 parts by weight of water to 100 parts by weight of monomer; wherein the total amount of emulsifying agent used is in the range of from 0.15 to 0.50 percent by weight based on the weight of the monomer; wherein the total amount of sulfate radical used is in the range of from 0.01 to 0.10% by weight based on the weight of the monomer; and wherein the total amount of sulfite radical used is in the range of from 0.01 to 1.5% by weight based on the weight of the monomer.

2. The process of claim 1, wherein the interaction of the materials in the polymerization medium is allowed to occur for a period of time ranging between 15 to 45 minutes.

3. The process of claim 1, wherein chloroprene is the sole monomer used.

4. The process of claim 1, wherein the chloroprene monomer formulation contains up to 20% by weight, based on the total monomer weight of at least one monomer which is copolymerizable with the chloroprene monomer.

5. The process of claim 1, wherein the ratio of water to polymerizable monomer is about 1.0 to 2.0:1.0.

6. The process of claim 1 wherein the amount of emulsifying agent used is in the range of from 0.20 to 0.30% by weight based on the weight of the monomer formulation.

7. The process of claim 1 wherein a portion of the emulsifying agent is added initially to the polymerization medium.

8. The process of claim 1, wherein the emulsifying agent is selected from the group consisting of ammonium and alkali metal salts of organic compounds containing from 10 to 20 carbon atoms.

9. The process of claim 1 wherein the compounds providing the redox catalyst system provide about 0.00001 to 0.006 percent by weight of sulfate radical and about 0.01 to 1.5 percent by weight of sulfite radical, both based upon the weight of the monomer formulation.

10. The process of claim 1 wherein the interaction occurs under vacuum and at a temperature of about 45° to 65° Centigrade.

11. The process of claim 1, wherein the sulfate radical is provided by a salt selected from the group consisting of ammonium and alkal metal persulfates and the sulfite radical is provided by an alkali metal bisulfite, the metal ion being provided as a trace impurity in the water.

12. The process of claim 1, wherein about 0.03 to 1.0 percent of an alkali metal bicarbonate, based upon the weight of the monomer, is admixed in the polymerization medium.

13. The process of claim 1, wherein the polymerization conditions comprise autogeneous pressure and temperatures ranging between about 45° and 65° Centigrade and the polymerization reaction is continued for a period of time sufficient to polymerize from about 60 to 98 percent of said chloroprene monomer formulation.

14. A polymerization process for producing large particles of chloroprene polymer having a weight average particle diameter in the range of from 0.25 to 1.5 microns and a monodisperse particle size distribution which process comprises:
   1. forming a polymerization medium by admixing water, a redox catalyst system comprising radicals of sulfate and sulfite, an activating metal ion, and optionally an emulsifying agent;
   2. allowing interaction of the materials in the polymerization medium to occur for a period of time ranging between 10 minutes and 3 hours, and thereafter;
   3. dispersing a chloroprene monomer formulation in the polymerization medium;
   4. dispersing into the polymerization medium
      a. a compound providing additional sulfate radical; and
      b. an emulsifying agent in the polymerization medium provided that polymerization of the monomer to polymer has begun before adding the emulsifying agent;
   5. polymerization the monomer formulation at a temperature in the range of from 45° to 65° C. until at least a major portion of the chloroprene monomer formulation has been converted to an aqueous dispersion of chloroprene polymer particles;

wherein the ratio of water to chloroprene monomer formulation is in the range of from 100 to 200 parts by weight of water to 100 parts by weight of monomer; wherein the total amount of emulsifying agent used is in the range of from 0.20 to 0.30 percent by weight based on the weight of the monomer; wherein the total amount of sulfate radical used is in the range of from 0.01 to 0.10% by weight based on the weight of the monomer; and wherein the total amount of sulfite radial used is in the range of from 0.01 to 1.5% by weight based on the weight of the monomer.

15. The process of claim 14, wherein the interaction of the materials in the polymerization medium is allowed to occur for a period of time ranging between 15 to 45 minutes.

16. The process of claim 14, wherein chloroprene is the sole monomer used.

17. The process of claim 14, wherein the chloroprene monomer formulation contains up to 20% by weight, based on the total monomer weight of at least one monomer which is copolymerizable with the chloroprene monomer.

18. The process of claim 14 wherein a portion of the emulsifying agent is added initially to the polymerization medium.

19. The process of claim 14, wherein the sulfate radical is provided by a salt selected from the group consisting of ammonium and alkali metal persulfates and the sulfate radical is provided by an alkali metal bisulfite, the metal ion being provided as a trace impurity in the water.

20. The process of claim 14, wherein about 0.03 to 1.0 percent of an alkali metal bicarbonate, based upon the weight of the monomer, is admixed in the polymerization medium.

* * * * *